(12) United States Patent
Simond

(10) Patent No.: US 7,051,410 B2
(45) Date of Patent: May 30, 2006

(54) SNAP HOOK WITH TWO OPPOSED CLOSING FIGURES

(75) Inventor: Ludger Simond, Houches (FR)

(73) Assignee: Etablissements Simond, Les Houches (FR)

( * ) Notice: Subject to any disclaimer, the term of this patent is extended or adjusted under 35 U.S.C. 154(b) by 54 days.

(21) Appl. No.: 10/888,458

(22) Filed: Jul. 9, 2004

(65) Prior Publication Data
US 2005/0011058 A1   Jan. 20, 2005

(30) Foreign Application Priority Data
Jul. 16, 2003  (FR) .................................. 03 08884

(51) Int. Cl.
*F16B 45/02* (2006.01)
(52) U.S. Cl. .................... 24/600.9; 24/599.1; 24/599.4
(58) Field of Classification Search ............... 24/599.1, 24/599.2, 599.4, 599.9, 600.1, 600.9, 601.2, 24/601.3, 601.4; 294/82.17, 82.19, 82.2, 294/82.21
See application file for complete search history.

(56) References Cited

U.S. PATENT DOCUMENTS

| | | | | |
|---|---|---|---|---|
| 644,699 A | * | 3/1900 | Woodford ................. | 294/82.2 |
| 762,097 A | * | 6/1904 | Smith ........................ | 24/599.6 |
| 797,941 A | * | 8/1905 | Corbett ...................... | 24/599.4 |
| 1,209,615 A | * | 12/1916 | Obsboum ................... | 24/598.3 |
| 1,716,997 A | * | 6/1929 | Tassos ..................... | 294/82.19 |
| 5,480,202 A | | 1/1996 | Gloden | |

FOREIGN PATENT DOCUMENTS

FR            2766884 A        2/1999

OTHER PUBLICATIONS

English Abstract corresponding to FR2766884 (cited on p. 1).

* cited by examiner

*Primary Examiner*—Robert J. Sandy
*Assistant Examiner*—Ruth C. Rodriguez
(74) *Attorney, Agent, or Firm*—William H. Eilberg

(57) ABSTRACT

The snap hook of the invention comprises a snap hook body closed by two closure fingers pivoting in opposite directions. The two closure fingers are separated by an insertion space. The insertion space has a width sufficient to allow the insertion of a loop oriented perpendicularly to the mean direction of the closure fingers. The insertion space becomes progressively narrower in the direction of the second end of the closure fingers. As a result, a loop may be inserted between the closure fingers, around the second end of the snap hook body, and pushing the loop, automatically inserts it into the snap hook, which thereafter remains locked.

10 Claims, 3 Drawing Sheets

SNAP HOOK WITH TWO OPPOSED CLOSING FIGURES

TECHNICAL FIELD OF THE INVENTION

The present invention concerns safety snap hooks requiring two separate actions to open them.

The snap hooks usually employed in mountaineering, potholing, and when working overhead in the construction and other industries generally comprise an open ring snap hook body having facing first and second ends separated by an opening, with a closure finger having two ends, articulated by its first end to the first end of the body to pivot toward the interior of the snap hook between a closed position in which its second finger end is in contact with the second end of the body and an open position in which its second finger end is offset from the second end of the body, return spring means spring-loading the closure finger toward the closed position.

Clearly, in the absence of additional safety means, the closure finger may accidentally pivot toward the open position when loaded, for example by a force applied by a tie such as a rope that enters the snap hook.

Safety snap hooks having additional locking means to prevent accidental pivoting toward the open position have long been envisaged.

For example, the locking means may comprise a threaded ring straddling the second end of the finger and the second end of the body in the closed position, or a spring ring that is pushed back into the straddling position, or a lever bearing against the closure finger to prevent it pivoting. All these means lock the closure finger against rotation.

The problem is that the locking action necessitates intentional action by the user, for example rotation of the locking ring. As a result, locking is not certain, as the user may forget to carry out the action necessary to obtain locking. As a result, safety requirements are not always complied with.

The document FR 2 766 884 describes a safety snap hook in which safety is automatically assured by providing two closure fingers that pivot in two opposite directions. Thus, a force exerted in one of these directions could open one of the two fingers, but necessarily holds the second finger in the closed position, with the result that the snap hook remains closed.

In the above document, the snap hook comprises an open ring snap hook body having facing first and second ends separated by an opening. An exterior closure finger is articulated by passing its first end through the first end of the snap hook body to pivot in a first direction toward the exterior of the snap hook. An interior closure finger is articulated by its second end to the first end of the snap hook body and is able to pivot in a second direction toward the interior of the snap hook. In several embodiments, the closure fingers consist of an elastically flexible material wire that is bent to form an elongate loop whose curved ends are engaged in respective offset transverse holes in the snap hook body.

In the closed position, the two closure fingers have their second ends in contact with the second end of the snap hook body, and the two closure fingers are parallel to each other and close together, the overall transverse dimension of the closure fingers being substantially equal to the transverse dimension of the metal wire forming the snap hook body.

Safety is correctly assured with this kind of prior art snap hook structure with two closure fingers. However, inserting a tie such as a rope into the snap hook necessitates a two-fold maneuver: a first maneuver consists in moving the exterior closure finger toward the exterior of the snap hook, followed by engaging the tie such as the rope between the two closure fingers; a second maneuver consists in pushing the interior closure finger toward the interior of the snap hook and moving the tie such as the rope toward the interior space of the snap hook. The two closure fingers are then returned to the closure position by the return spring means. An opposite two-fold operation is necessary to remove the tie such as the rope from the snap hook.

These operations, in particular for inserting a tie such as a rope into the interior of the snap hook, are relatively complex, and generally necessitate the use of both the user's hands, one to hold the snap hook or the exterior finger to be opened, and the other to hold the tie such as the rope to be inserted. As a result, it is not possible to operate this kind of safety snap hook with only one hand, in contrast to basic snap hooks with no safety feature, into which a rope may be inserted by simply pressing the rope radially toward the interior of the snap hook against the closure finger.

The document U.S. Pat. No. 5,480,202 A discloses a crane hook for lifting loads of several tonnes, comprising a J-shaped hook body with an upper first end having an attachment hole, and whose curved lower portion may be closed by an interior closure plate and an external closure plate.

Both the closure plates are articulated at their first end to an intermediate region of the hook body, at a significant distance from the first upper end with the attachment hole.

In the closed position, the exterior closure plate has an intermediate region bearing on the second end of the hook body. The two plates diverge progressively in the direction of their free second end. The object of these means is to prevent untimely snagging of the crane hook on fences, electrical cables or other construction elements. Apart from the fact that the device does not relate to closed-ring safety snap hooks, the document does not mention the problem of using a snap hook with only one hand, and the means described do not provide for such use. Moreover, the second end of the exterior plate, which projects significantly away from the second end of the hook body, constitutes a bulky member that would not provide satisfactory safety if applied to a snap hook: a rope inserted into the hook but able to slide along it could abut against the second end of the exterior plate and enter the interior of the hook a second time and thereby escape from the interior of the latter of its own accord.

SUMMARY OF THE INVENTION

The problem addressed by the present invention is that of designing a new safety snap hook structure, that assures as good automatic safety as a prior art snap hook with two opposed closure fingers, and that simultaneously allows easier maneuvering to insert a tie such as a rope into the snap hook, enabling the tie such as the rope to be inserted with only one hand.

To achieve the above and other objects, the invention proposes a safety snap hook for attaching a tie, comprising:
  an open ring snap hook body having a first end and a second end facing each other and separated by an opening,
  an exterior closure finger with two ends, articulated at its first end to the first end of the snap hook body to pivot relative to the snap hook body in a first direction toward the exterior of the snap hook, between a closed position in which its second end is in contact with an exterior surface of the snap hook body and an open position in which its second end is offset from the second end of the snap hook body, and with return spring means for spring-loading the exterior closure finger toward its closed position, and an interior closure finger with two ends, articulated at its first end to a point at or near the first end of the snap hook body to pivot relative to the snap hook body in a second direction toward the interior of the snap hook, between a closed position in which its second end comes into contact with an interior surface region of the snap hook body, and an open position in which its second end is offset from the second end of the snap hook body, with return spring means for spring-loading the interior closure finger toward the closed position, an insertion space is formed between the two closure fingers, the insertion space has a width sufficient to allow the insertion of the tie formed into a loop oriented perpendicularly to the mean direction of the closure fingers, the insertion space becomes progressively narrower in the direction of the second end of the closure fingers, and the interior surface region and the exterior surface region are set back from the second end of the snap hook body, said second end of the snap hook body forming an insertion nose that projects into the insertion space.

Increasing the width of the insertion space necessarily increases the overall bulk of the snap hook. Now, this overall bulk must often be maintained within relatively small values, as is the case for mountaineering and potholing, and/or for attachments that are easily movable. It is therefore preferable to choose an insertion space width that is just sufficient to allow the insertion of the above kind of loop formed by curving a tie of the kind routinely used, advantageously a rope of the usual diameter.

In practice, when the snap hook is to be used for attaching running lines such as mountaineering or potholing ropes, the loop has a diameter from approximately 2.5 cm to approximately 4 cm, frequently approximately 3 cm. For this reason it is advantageous for the width of the insertion space to be not very different from the diameter of the loop.

Greater dimensions are nevertheless possible and advantageous for snap hooks used in industry, for example, or for fixed attachments that it is not required to move frequently and where easier maneuvering is a requirement.

The insertion nose advantageously has an end section that is offset from both the closure fingers, forming two gaps between the insertion nose and the exterior closure finger and the interior closure finger, respectively.

In one practical embodiment, the interior closure finger is formed of an elastically flexible material wire bent to form an elongate loop whose curved ends are engaged in two respective transverse holes offset from the first end of the snap hook body to constitute the articulated first end of the interior closure finger, the elasticity of the wire forming the interior closure finger returning it to the closed position.

One option is for the exterior closure finger to be a generally cylindrical rod articulated to the first end of the snap hook body.

In this case, it is advantageous if the first end of the exterior closure finger comprises an interior arm inside the interior space of the snap hook and to which the interior closure finger is articulated, said interior closure finger being formed of an elastically flexible material wire bent to form a loop whose curved ends are engaged in respective offset transverse holes in the interior arm to constitute the first articulated end of the interior closure finger, the inherent elasticity of the wire forming the interior closure finger then returning the two closure fingers to the closed position.

Another option is for the exterior closure finger to be formed of an elastically flexible material wire bent to form an elongate loop whose curved ends are engaged in two respective offset transverse holes in the first end of the snap hook body to constitute the articulated first end of the exterior closure finger, the inherent elasticity of the wire forming the exterior closure finger returning it to the closed position.

BRIEF DESCRIPTION OF THE DRAWINGS

Other objects, features and advantages of the present invention will emerge from the following description of particular embodiments, given with reference to the appended drawings, in which.

DESCRIPTION OF THE PREFERRED EMBODIMENTS

Figure 1:
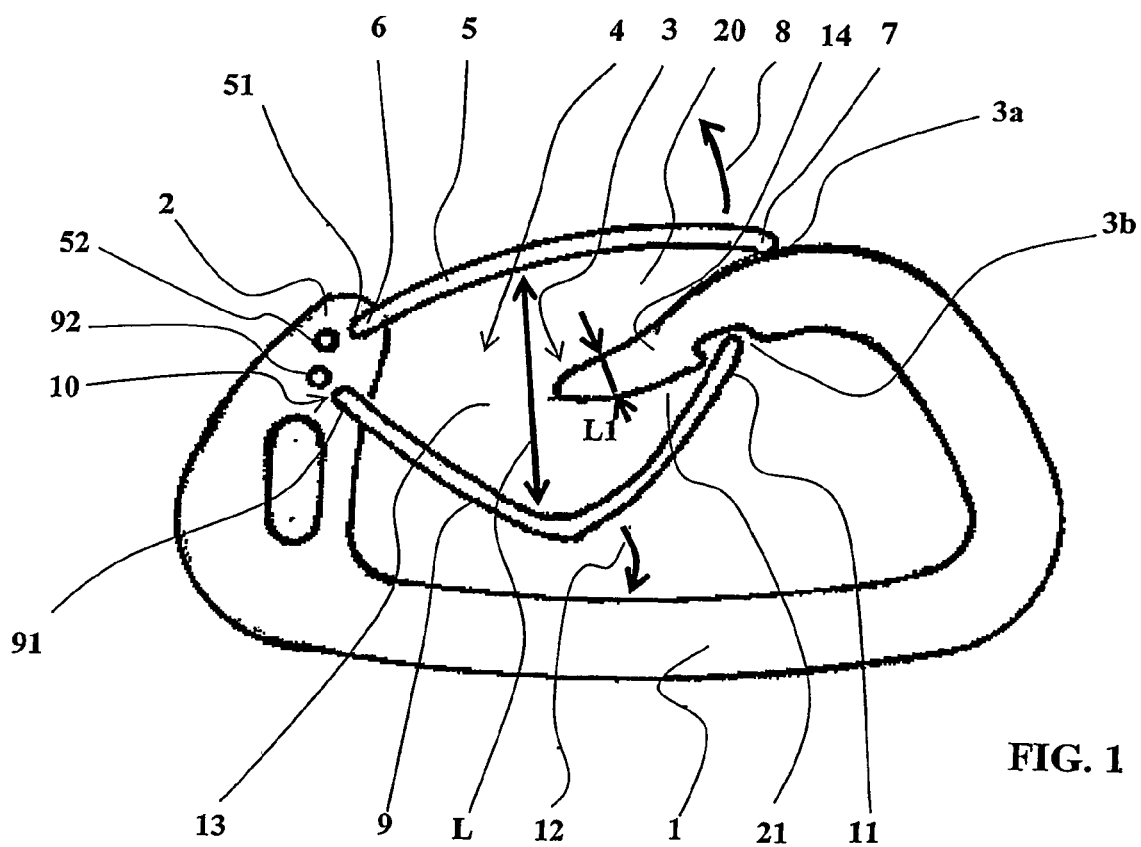
FIG. 1 is a side view of a first embodiment of a snap hook according to the present invention, shown closed.

Both embodiments of a safety snap hook according to the invention shown in the figures comprise an open ring snap hook body 1 having facing first and second ends 2, 3 separated by an opening 4.

An exterior closure finger 5 has a first end 6 and a second end 7. The exterior closure finger 5 is articulated by its first end 6 to the first end 2 of the snap hook body 1 to pivot in a first direction toward the exterior of the snap hook, as shown by the arrow 8, between a closed position shown in FIG. 1 or FIG. 2 in which its second end 7 is in contact with an exterior surface region 3a of the snap hook body 1 in the vicinity of its second end 3, and an open position in which its second end 7 is offset from the second end 3 of the snap hook body 1.

Return spring means, to be described later, spring-load the exterior closure finger 5 toward the closed position.

An interior closure finger 9 has two ends 10 and 11. The interior closure finger 9 is articulated at its first end 10 to the snap hook body 1 to pivot in a second direction 12 toward the interior of the snap hook between a closed position shown in FIGS. 1 and 2 in which its second end 11 is in contact with an interior surface region 3b of the snap hook body 1 and an open position in which its second end 11 is offset from the second end 3 of the snap hook body 1.

Return spring means spring-load the interior closure finger 9 toward its closed position.

Figure 2:
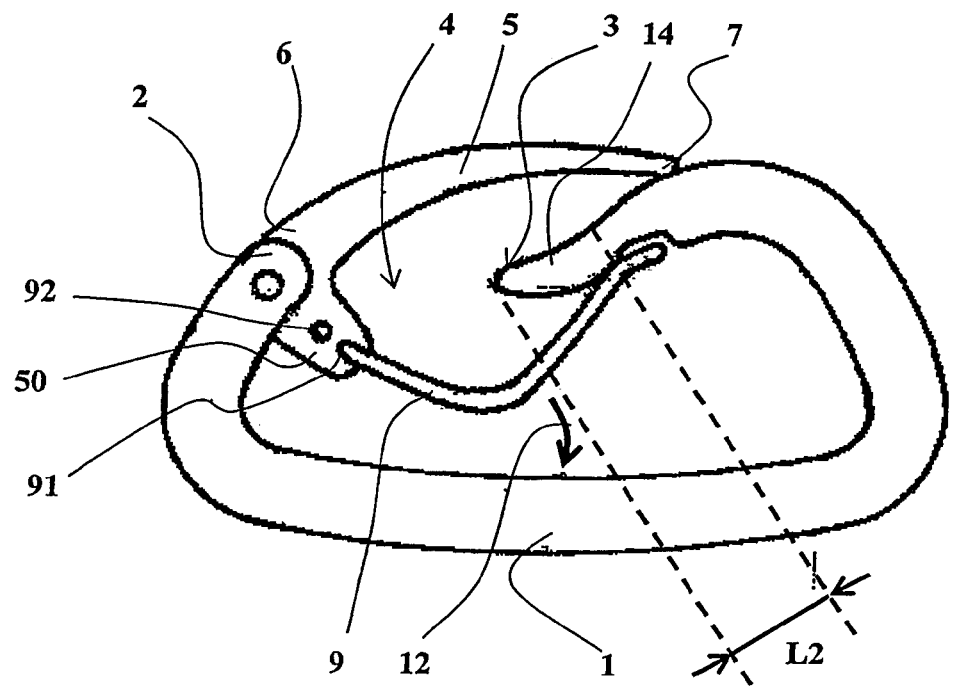
FIG. 2 is a side view of a second embodiment of a snap hook according to the present invention, shown closed.
Figure 3:
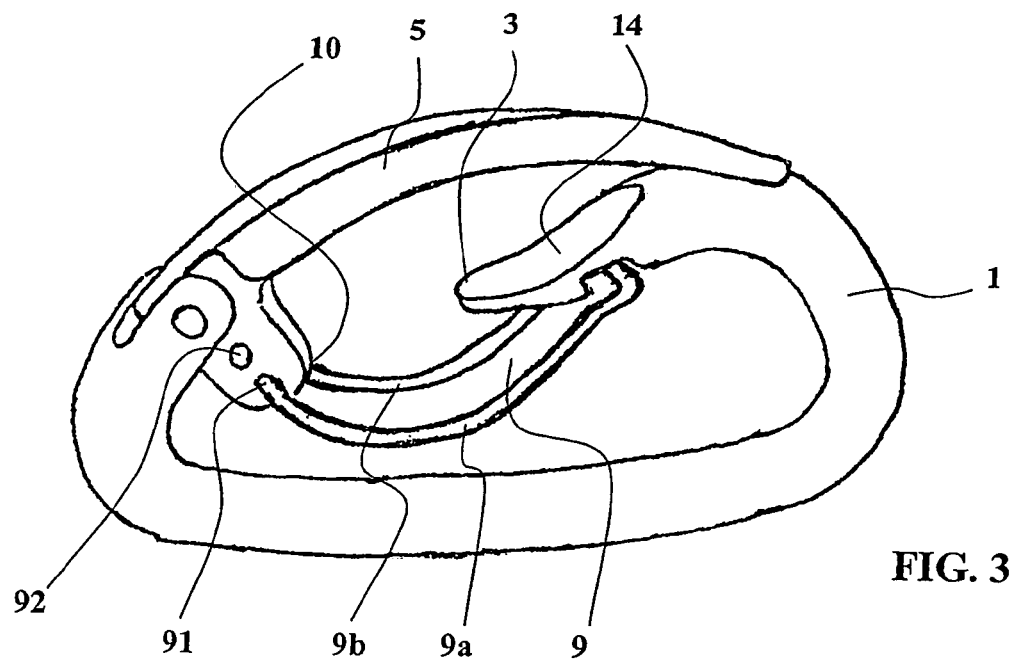
FIG. 3 is a perspective view of the FIG. 2 snap hook, shown closed.

In both the embodiments shown in FIGS. 1 and 2, and as seen better in FIG. 3, the interior closure finger 9 has a structure known in the art comprising an elastically flexible wire conformed into an elongate loop, the two ends 91 and 92 of the wire constituting the first end 10 of the interior closure finger 9 and for this reason being oppositely curved at 90° in order to be engaged in two offset transverse holes forming the articulation of the interior closure finger 9. The wire may advantageously be steel wire with a diameter from approximately 1 mm to approximately 2 mm.

The elastic wire is formed so that its inherent elasticity tends to return the interior closure finger 9 toward the closed position, so that no other return spring means are needed.

In the first embodiment, shown in FIG. 1, the two curved ends 91 and 92 of the wire enter two transverse holes provided in the first end 2 of the snap hook body 1.

In the second embodiment, shown in FIG. 2, the two curved ends 91 and 92 of the wire are engaged in two transverse holes provided in a short interior arm 50 of the exterior closure finger 5, and are therefore in the vicinity of the first end 2 of the snap hook body.

In the embodiment shown in FIG. 1, the exterior closure finger 5 is also formed by an elastically flexible material wire bent to form an elongate loop whose curved ends 51 and 52 are engaged in two respective offset transverse holes in the first end 2 of the snap hook body 1 to constitute the articulated first end 6 of the exterior closure finger 5. The inherent elasticity of the wire also returns the exterior closure finger 5 to the closed position.

In the second embodiment, shown in FIG. 2, the exterior closure finger 5 has a conventional generally cylindrical and slightly curved rod structure, and return spring means must be provided to return it to the closed position. One option is to provide conventional return spring means, in the form of a compression spring engaged in an axial housing of the closure finger to bear on a tongue fastened to the snap hook body 1. A second option is to exploit the spring return force of the interior closure finger 9, using the arrangement shown in FIG. 2: in this case, the first end 6 of the exterior closure finger 5 comprises an interior arm 50 inside the interior space of the snap hook and to which the interior closure finger 9 is articulated. The inherent elasticity of the wire constituting the interior closure finger 9 then returns the two closure fingers 5 and 9 to the closed position.

In all the embodiments shown in the figures, the snap hook further comprises an insertion space 13, between the two closure fingers 9 and 5, and of sufficient width L to allow the insertion of a loop 16 (see FIGS. 4 and 5), as described later. In practice, the greatest width L of the insertion space 13 may be from approximately 2.5 cm to approximately 4 cm in snap hooks of the kind usually employed for mountaineering and potholing, this width L being adapted for the insertion of a loop 16 of rope of the usual diameter. The width L may advantageously be approximately 3 cm.

The insertion space 13 becomes progressively narrower in the direction of the second end 11 or 7 of the closure fingers 5 or 9, as may be seen in FIGS. 1 and 2. In practice, the exterior closure finger 5 is slightly convex toward the exterior, giving the snap hook an exterior contour similar to the contours of the prior art snap hooks usually employed. Conversely, the interior closure finger 9 is strongly convex toward the interior of the snap hook. To allow sufficient opening movement, as indicated by the arrow 12, the two lateral branches 9a and 9b of the elastic wire are separated from each other, as shown in FIG. 3, by a distance slightly greater than the diameter of the wire forming the snap hook body 1, so that, in the open position, the two lateral branches 9a and 9b of the wire can pivot on either side of the central branch of the snap hook body 1.

Advantageously, as shown in FIGS. 1 and 2, the interior surface region 3b and the exterior surface region 3a on which the respective second ends 11 and 7 of the closure fingers 9 and 5 bear in the closed position, are set back from the second end 3 of the snap hook body 1. As a result, the second end 3 of the snap hook body 1 forms an insertion nose 14 that projects into the insertion space 13.

The insertion nose 14 may advantageously have an end section that is offset from both the closure fingers 5 and 9, forming two gaps 20 and 21 between the insertion nose 14 and the exterior closure finger 5 and the interior closure finger 9, respectively. The end section of the insertion nose 14 may also have a width L1, in the general plane of the snap hook, that becomes narrower toward the end of the insertion nose 14 or the second end 3 of the snap hook body 1.

Figure 4:
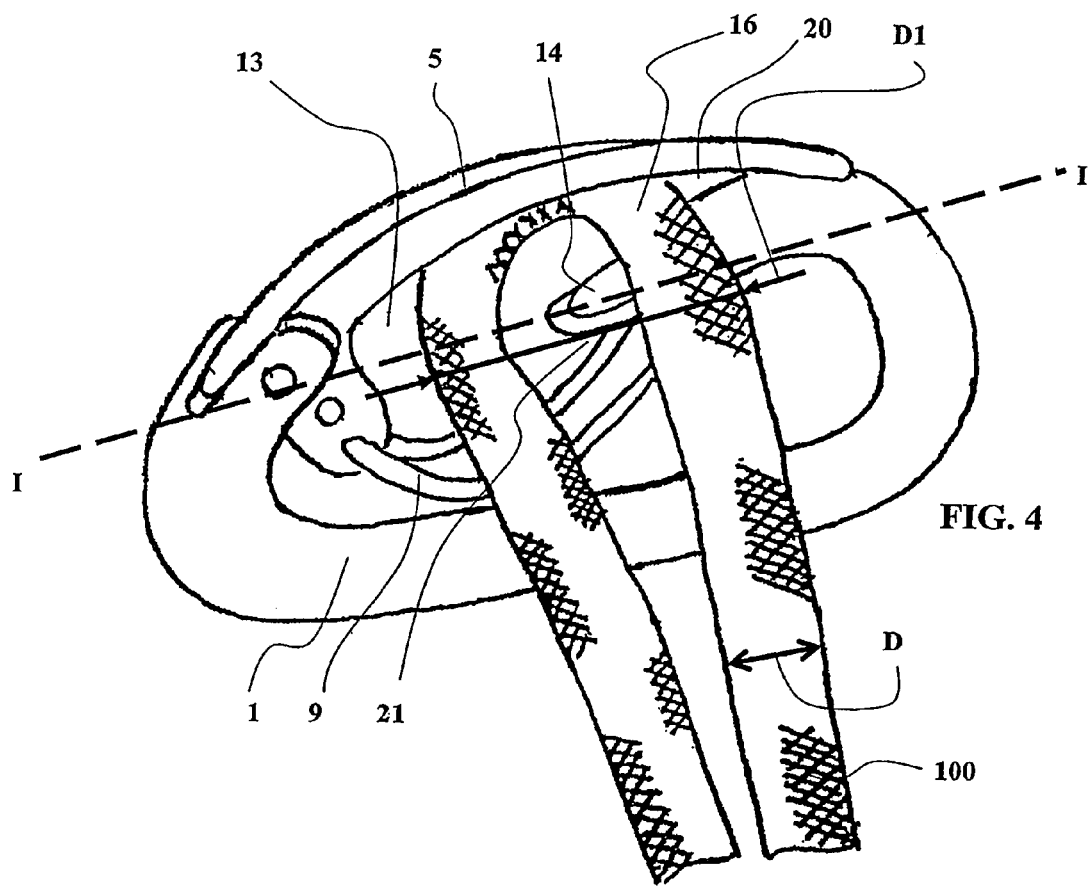
FIG. 4 is a perspective view of the FIG. 3 snap hook during insertion of a loop into the insertion space.
Figure 5:
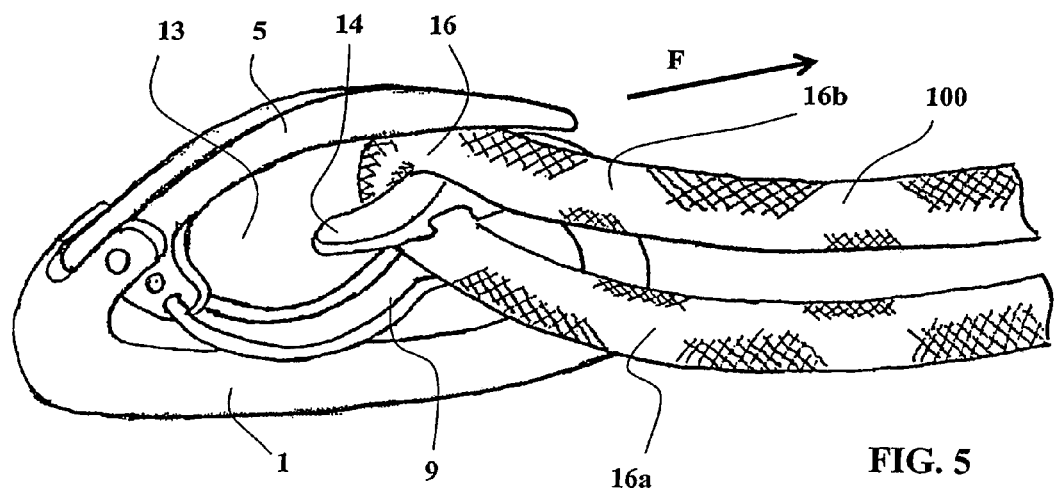
FIG. 5 is a perspective view of the FIG. 3 snap hook during penetration of the loop into the snap hook.

The end section of the insertion nose 14 may advantageously have a length L2 (see FIG. 2) greater than or equal to the radius of the tie 100 forming the loop (see FIGS. 4 and 5).

The manner in which a safety snap hook according to the invention may be used is described next with reference to FIGS. 4 and 5.

In FIG. 4, the snap hook is closed, as in FIG. 3. The insertion space 13 is sufficiently wide to allow the user to insert a loop 16 formed of the tie 100 that is to be inserted into the snap hook. For example, the loop 16 is formed in a rope 100 whose diameter D is appropriate to the intended use. For example, the diameter D is of the order of 6 to 11 mm. As a result, the loop 16 has a diameter D1 from approximately 2.5 cm to approximately 4 cm, as a function of the diameter of the rope. The width L of the insertion space 13 is chosen to be only slightly different from the diameter D1 of the loop 16 in the tie such as the rope 100 to be used.

The user is therefore able to insert the loop 16 into the insertion space 13, holding the loop 16 in a plane substantially perpendicular to the mean direction I—I of the closure fingers 5 and 9.

Then, as shown in FIG. 5, the user is able to push the loop 16 by applying a longitudinal force F in the mean direction I—I of the closure fingers 5 and 9, while holding the loop 16 in a plane perpendicular to the direction I—I. As a result, the loop 16 is engaged in the progressively narrower space, and, if the snap hook comprises an insertion nose 14, the loop 16 is engaged around the insertion nose 14 in the gaps 20 and 21 (see FIGS. 1 and 4). As it moves in the direction of the force F, the loop 16 simultaneously pushes the two closures fingers 5 and 9 back toward their open positions, with the result that one strand 16a of the loop 16 is inserted into the interior space of the snap hook, while the other strand 16b of the loop 16 lies outside the snap hook. Finally, the tie 100 such as the rope passes through the interior space of the snap hook, which is what was intended. In this position, the tie 100 may no longer escape from the snap hook, regardless of the force exerted in the closure fingers 5 and 9, one of the fingers being always abutted in the closure position regardless of the direction of the force.

The penetration movement of the loop 16 into the snap hook, shown in FIGS. 4 and 5, may be executed with only one hand, which considerably facilitates using the snap hook.

Clearly the insertion nose 14 with its end section offset from both of the closure fingers 5 and 9 facilitates positioning the loop 16 on either side of the second end 3 of the snap hook body 1. Nevertheless, a snap hook in accordance with the invention may be designed that operates relatively satisfactorily even with no space between the end section of the insertion nose 14 and one or the other of the closure fingers 5 and 9.

The present invention is not limited to the embodiments that have just been described explicitly, but encompasses variants and generalizations thereof within the scope of the following claims.

What is claimed is:

1. Safety snap hook for attaching a tie, comprising:
   an open ring snap hook body having a first end and a second end facing each other and separated by an opening,
   an exterior closure finger with two ends, articulated at its first end to the first end of the snap hook body to pivot relative to the snap hook body in a first direction toward the exterior of the snap hook, between a closed position in which its second end is in contact with an exterior surface of the snap hook body and an open position in which its second end is offset from the second end of the snap hook body, and with return spring means for spring-loading the exterior closure finger toward its closed position, and
   an interior closure finger with two ends, articulated at its first end to a point at or near the first end of the snap hook body to pivot relative to the snap hook body in a second direction toward the interior of the snap hook, between a closed position in which its second end comes into contact with an interior surface region of the snap hook body, and an open position in which its second end is offset from the second end of the snap hook body, with return spring means for spring-loading the interior closure finger toward the closed position, wherein:
   an insertion space is formed between the two closure fingers,
   the insertion space has a width sufficient to allow the insertion of the tie formed into a loop oriented perpendicularly to a mean direction of the closure fingers,
   the insertion space becomes progressively narrower in the direction of the second end of the closure fingers, and
   the interior surface region and the exterior surface region are set back from the second end of the snap hook body, said second end of the snap hook body forming an insertion nose that projects into the insertion space.

2. Safety snap hook according to claim 1, wherein the width of the insertion space is not greatly different from the diameter of the loop.

3. Safety snap hook according to either claim 1 or claim 2, wherein the greatest width of the insertion space is from approximately 2.5 cm to approximately 4 cm and advantageously approximately 3 cm.

4. Safety snap hook according to claim 1, wherein the insertion nose has an end section that is offset from both the closure fingers, forming two gaps between the insertion nose and the exterior closure finger and the interior closure finger, respectively.

5. Safety snap hook according to claim 4, wherein the end section of the insertion nose has a width, in the general plane of the snap hook, that decreases toward the end of the insertion nose.

6. Safety snap hook according to either claim 4 or claim 5, wherein the end section of the insertion nose has a length greater than or equal to the radius of the tie forming the loop.

7. Safety snap hook according to claim 1, wherein the interior closure finger is formed of an elastically flexible material wire bent to form an elongate loop whose curved ends are engaged in respective transverse holes offset from the first end of the snap hook body to constitute the articulated first end of the interior closure finger, the elasticity of the wire forming the interior closure finger returning it to the closed position.

8. Safety snap hook according to claim 7, wherein the exterior closure finger is a generally cylindrical rod, articulated to the first end of the snap hook body.

9. Safety snap hook according to claim 8, wherein the first end of the exterior closure finger comprises an interior arm inside the interior space of the snap hook and to which the interior closure finger is articulated, said interior closure finger being formed of an elastically flexible material wire bent to form a loop whose curved ends are engaged in respective offset transverse holes in the interior arm to constitute the first articulated end of the interior closure finger, the inherent elasticity of the wire forming the interior closure finger then returning the two closure fingers to the closed position.

10. Safety snap hook according to claim 7, wherein the exterior closure finger is formed of an elastically flexible material wire bent to form an elongate loop whose curved ends are engaged in two respective offset transverse holes in the first end of the snap hook body to constitute the articulated first end of the exterior closure finger, the inherent elasticity of the wire forming the exterior closure finger returning it to the closed position.

* * * * *

UNITED STATES PATENT AND TRADEMARK OFFICE
CERTIFICATE OF CORRECTION

| | | |
|---|---|---|
| PATENT NO. | : 7,051,410 B2 | Page 1 of 1 |
| APPLICATION NO. | : 10/888458 | |
| DATED | : May 30, 2006 | |
| INVENTOR(S) | : Ludger Simond | |

It is certified that error appears in the above-identified patent and that said Letters Patent is hereby corrected as shown below:

Title Page, Item (54) Title: please delete the word "FIGURES" and insert instead --FINGERS--.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,051,410 B2 |
| APPLICATION NO. | : 10/888458 |
| DATED | : May 30, 2006 |
| INVENTOR(S) | : Ludger Simond |

It is certified that error appears in the above-identified patent and that said Letters Patent is hereby corrected as shown below:

Title Page, Item (54) and at Column 1, line 2, Title: please delete the word "FIGURES" and insert instead --FINGERS--.

This certificate supersedes the Certificate of Correction issued March 9, 2010.

Signed and Sealed this

Thirtieth Day of March, 2010

David J. Kappos
*Director of the United States Patent and Trademark Office*